United States Patent
Layman

[15] 3,695,804
[45] Oct. 3, 1972

[54] SHEET MOLDING APPARATUS INCLUDING MEANS FOR REMOVING MOLDED ARTICLES FROM THE SHEET MATERIAL

[72] Inventor: Lee R. Layman, Windsor Locks, Conn.

[73] Assignee: Monsanto Company, St. Louis, Mo.

[22] Filed: March 25, 1970

[21] Appl. No.: 22,599

[52] U.S. Cl. .................425/292, 164/301, 264/335
[51] Int. Cl. .............................................B22c 17/04
[58] Field of Search ...18/2 RA, 4 B, 5 A, 19 F, 19 R; 264/335, 92

[56] References Cited

UNITED STATES PATENTS

| | | | |
|---|---|---|---|
| 2,121,721 | 6/1938 | Welker | 264/335 X |
| 2,744,286 | 5/1956 | Carpenter et al. | 18/2 RA X |
| 2,974,364 | 3/1961 | Lambert et al. | 264/335 X |
| 3,162,077 | 12/1964 | Brummer | 18/19 R X |
| 3,240,851 | 3/1966 | Scalora | 18/19 F X |
| 3,381,068 | 4/1968 | Leiper et al. | 18/19 F X |
| 3,190,946 | 6/1965 | Keyes | 264/92 |

FOREIGN PATENTS OR APPLICATIONS

| | | | |
|---|---|---|---|
| 1,336,085 | 7/1963 | France | 18/19 F |

*Primary Examiner*—R. Spencer Annear
*Attorney*—James C. Logomasini, Michael J. Murphy and Neal E. Willis

[57] ABSTRACT

Articles formed from sheet material in a trim in place thermoforming operation are separated from the remainder of the sheet and rapidly removed from the place of separation by a method which involves angularly directing a jet of high velocity gas at the article as the sheet with the article partially separated therefrom is passing over a stripping surface. The apparatus includes a conduit immediately adjacent the stripping surface with a series of angularly oriented openings formed therein for passage of the gas therethrough.

3 Claims, 2 Drawing Figures

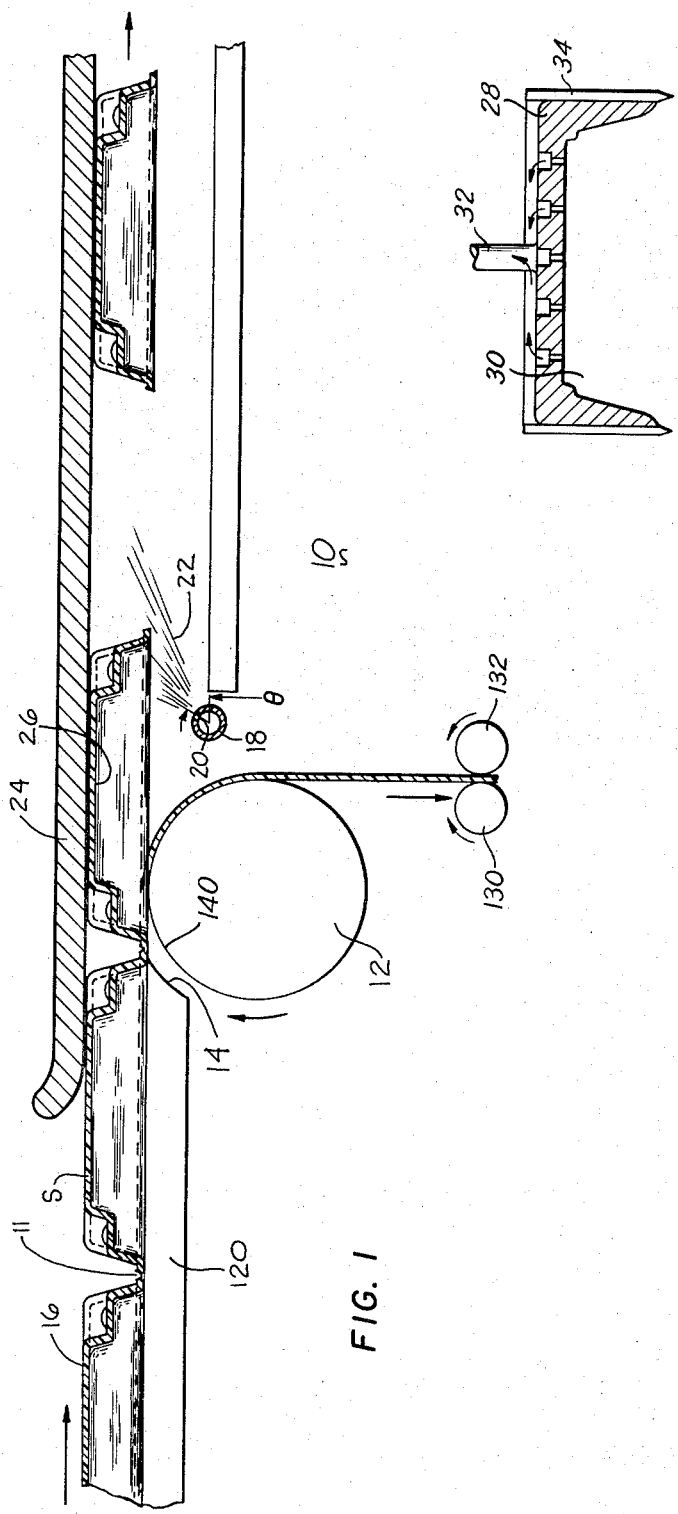

SHEET MOLDING APPARATUS INCLUDING MEANS FOR REMOVING MOLDED ARTICLES FROM THE SHEET MATERIAL

BACKGROUND OF THE INVENTION

This invention relates in general to improvements in equipment systems for molding articles from sheet material and in particular to improvements in separating such molded articles from the sheet and in removing them from the place of separation.

Several types of forming are known for simultaneously shaping plural articles in recurring cycles from portions of a generally continuous plastic sheet. One technique is by pneumatic pressure differential forcing of portions of a heated area of the sheet against the surfaces of mold cavities to form depressions therein using sealing blades to hold the pressure in each mold during forming, followed by a creasing or scoring of the sheet by the blades around the formed articles at the seal while still in the press. This creasing extends almost but not entirely through the thickness of the sheet in order that the articles may be transferred out of the forming station while still held in the sheet. Thereafter, the sheet with the articles retained therein is passed across a stripping roll for the purpose of breaking the articles out of the sheet along the creases whereupon the scrap sheet or web is accumulated or immediately reprocessed as desired. U. S. Pat. No. RE 26,413 illustrates a machine operating on these principles. This type of forming is referred to as a type of trim in place thermoforming, as opposed to post trim thermoforming wherein a separate trimming press is required downstream of the forming station to separate the articles from the sheet, or the cut in place technique wherein the articles are entirely severed from the sheet while in the forming press and then must be individually removed therefrom. From the standpoint of speed and economy, trim in place thermoforming of the first mentioned variety is highly desirable since the portion of the sheet or web between the mold cavities is used to transport the containers out of the forming press while the articles are still attached therein.

With respect to the sealing blades, as can be expected, the sheet contacting surfaces of these blades will become blunt with wear after numerous cycles of the equipment. Also, over a period of time, one or more blades may need replacing whereas the remainder might not, with the result being that the leading surfaces of the blades may not all be aligned in a common plane after reassembly. Either of these conditions will produce variable levels of sheet penetration around the peripheries of the articles during the second trimming stroke of the sealing blades. If the sheet has not been penetrated sufficiently around each article, when it is directed across the stripping roll the articles instead of cleanly snapping out of the sheet do so only partially and tend to undesirable follow the web, or else discharge unevenly from the sheet in a misaligned manner.

Also, in prior art systems, the rate of article removal away from its place of separation from the sheet has been dependent on the rate of advancement of the sheet through the apparatus. Accordingly, if an auxiliary downstream operation had to be performed on a separated article in connection with the manner of collecting the finished articles e.g., rotating the article to place it in proper position for stacking, which, of course, requires a certain increment of time, successive articles would undesirably back up on each other and require that the system be shut down for clearing. In addition, when revisions are made to upstream portions of the system to increase capacity, it may be that the article removal portions of the system to increase capacity, it may be that the article removal portion of the system may become limiting as regards overall capacity.

SUMMARY OF THE INVENTION

Now there has been discovered a unique method and apparatus for overcoming the above mentioned deficiencies of the prior art.

Accordingly, it is a principal object of this invention to provide method and apparatus improvements in the portion of a trim in place thermoforming system where the articles are separated from the sheet material.

Another object of this invention is to provide a method and apparatus for assisting in removing a molded plastic article from the surrounding sheet from which it was formed in a trim in place thermoforming system.

An additional object of this invention is to provide a method and apparatus for use in a trim in place plural forming thermoforming system for increasing the spacing between successive articles after their release from the sheet without increasing article spacing in the sheet itself.

A further object of this invention is to provide a method and apparatus for rapidly accelerating successively formed, lightweight, molded thermoplastic articles away from the place of their separation from the sheet from which they were formed.

Other objects of this invention will in part be obvious and will in part appear hereinafter.

These and other objects are accomplished in a thermoforming process for shaping an article from a portion of a heated sheet of thermoplastic by forcing the heated portion into a mold having a cavity conforming to the shape of the article, penetrating part way through the sheet with a cutting element around the periphery of the article, advancing the sheet with the article attached therein angularly across a stripping surface to at least partially separate the article along the sheet surface penetrated by the cutting element, by providing the improvement which comprises directing a jet of high velocity gas against the partially separated article as the sheet is advancing across the stripping surface to assist in separating the article from the sheet and to rapidly convey the separated article away from the stripping surface.

With respect to the action of the jet on successive articles, this jet imparts a velocity of each article after complete separation from the sheet which greatly exceeds the velocity of the next successive article before removal from the sheet, thereby developing a distance between successive articles which is substantially greater than the distance between said successive articles before separation from the sheet.

The apparatus includes a conduit adjacent the stripping surface having a plurality of angularly oriented openings therein for passage of the pressurized gas therethrough to assist in separating the article from the sheet and a constraining member downstream of the conduit to force the separated article to travel in a predetermined direction under the influence of the pressurized gas.

BRIEF DESCRIPTION OF THE DRAWING

In describing the overall invention, reference will be made to the accompanying drawing wherein Fig. 1 is a schematic, elevational view of one form of the apparatus of the present invention, and FIG. 2 is a view similar to FIG. 1 of another portion of the apparatus located upstream from that in FIG. 1.

DETAILED DESCRIPTION OF THE PREFERRED EMBODIMENT

Referring now to the drawing, there is shown in dark lines, apparatus of the present invention which is generally indicated as 10 and which is preferably mounted as shown immediately downstream of equipment of type illustrated in Fig. 2 in U. S. Pat. No. RE 26,413, the subject matter of which is herein incorporated by reference. More specifically, table 120 shown in the present drawing is identical to that bearing a similar number in Fig. 2 of the referenced patent. A stripping roll 12, however, is provided between end 14 of table 120 and friction rolls 130 and 132 of the referenced patent; surface 140 of the latter referenced patent also bears the same numeral in the present drawing.

The major, known, components of a trim in place thermoforming system which are shown and described U.S. Pat. No. RE 26,413 include a mold 28 having a cavity 30 conforming to the shape of the article being formed, means, 32 such as pneumatic differential pressure, for forcing a heated sheet portion from which the article is to be formed against the cavity surface, a cutting element 34, such as a blade, for penetrating the sheet around the periphery of the article (11 in Fig. 1 of the present drawing) to partially separate it from the sheet. These latter, known elements are depicted in FIG. 2 and are conventionally located in the molding station upstream of the apparatus of FIG. 1. Also included are means, such as a piston driven endless chain drive, for advancing the sheet with the partially separated article attached therein across a stripping surface, such as roll 12, to at least partially release the article from the sheet.

Though the article may be of any shape, it is illustrated herein as a relatively shallow packaging tray 16, being formed from a portion of a sheet S of thermoplastic material.

Apparatus 10 of the present invention includes horizontally extending conduit 18 immediately adjacent the surface of stripping roll 12. Conduit 18 extends across the width of the apparatus of U.S. Pat. No. RE 26,413 in a direction perpendicular to that of sheet advancement. Conduit 18 has a plurality of openings or holes 20 formed in the wall thereof oriented at an angle o from the horizontal, for passage of pressurized gas 22 therethrough to assist in separating trays 16 from sheet S. Conduit 18 is connected to a conventional source of pressurized gas such as air, not shown. Constraining member 24 having a turned up leading end generally overlies the place of separation of each tray 16 from sheet S and extends well downstream of stripping roll 12 in order to force separated articles 16 to travel in a predetermined direction under the influence of the pressurized gas issuing through holes 20 in conduit 18. It may be constructed of any rigid material and can be transparent in whole or in part to permit observation of the moving articles. Verticle sides (not shown) extending between member 24 and loser member 140 are provided.

In operation, and as illustrated in the referenced patent with respect to known components, sections of a heated portion of sheet S are simultaneously forced by means of pneumatic pressure into a series of molds, e.g. 28 mounted above sheet S on a reciprocable platen, and which have cavities, e.g. 30, conforming to the shape of trays 16. A cutting or creasing element 34 located around each mold is caused to penetrate part way through sheet S around the periphery of each formed article to the extent of about 90 percent of the sheet thickness. The sheet portion with the formed articles attached therein is then advanced, by means of a sheet advance mechanism, across the surface of stripping roll 12, where, because of the rigidity of the formed article in comparison with that of the flexible sheet, the article at least partially continues in a straight line in the direction of upstream sheet advance, whereas the remainder of the sheet or web intermediate the articles proceeds downwardly. Separation, therefore, is at least partial along the surface of the sheet in the area of pervious penetration by the cutting elements. However, and as previously mentioned, if the amount of sheet thickness by which the articles are held therein is excessive after the second trimming stroke of the cutting elements, each article will not completely separate from the sheet and will continue along with the web down across the stripping roll according to whichever portion of its periphery the excessive sheet thickness is located.

According to the present invention, however, the jet of high velocity gas 22 angularly impinging against inner surface of roll 12 assists in breading tray 16 away from sheet S and overcomes any tendency of the web to carry the article along with it.

The rate at which tray 16 is advancing upstream of roll 12 is of course determined by the sheet advance mechanism, and must be relatively low to avoid premature separation as the sheet slows down and starts up during its cyclic movement. It is usually on the order of 120–500 feet per minute. However, when a released article is introduced into the path of air jet 22, the velocity of which is on the order of 7,500 feet per minute, the resulting velocity of the tray will approach this value, being less than this to the extent of frictional effects between the surface of the tray and that of constraining member 24. Consequently, the difference in velocity between that of a fully separated article under the influence of the air jet and that of an article or tray attached to the sheet upstream of the stripping roll 12 represents its acceleration. This acceleration results in a substantial distance or space being opened up between successive trays without, of course, increasing their spacing in the sheet prior to separation. Since sheet utilization would be greatly decreased, the later approach is obviously undesirable.

The above description and particularly the drawings are set forth for purposes of illustration only and are not to be taken in a limited sense.

The air jet of the present invention serves a two-fold purpose, i.e., a.) to assist in stripping the molded articles out of the sheet material, and b.) to accelerate the detached articles away from the place of separation. To accomplish the first function, the article, which may alternatively be considered to be a series of individual items to be removed from the sheet at one time, obviously must be just barely held in the sheet prior to separation, a cutting element having been previously substantially introduced into the sheet around the periphery of the article in the upstream forming press, though not necessarily uniformly penetrated to the same extent around the full periphery. Such total penetration should be on the order of 90 to 95 percent of the sheet thickness. To assist most effectively in article removal, the air conduit should be located immediately adjacent the stripping roll incrementally below the plane of the advancing sheet and the jet issuing therefrom should be imposed on the article angularly in the direction of movement of the article. Best results in terms of assisting in article removal are obtained when the openings in the conduit and consequently the air issuing from the openings is at an angle of between 15° to 70° with a horizontal plane. At angles greater than 70°, the vertical component of the force acting on the article is sufficiently great to force the article upwardly against the constraining member rather than horizontally toward the place of downstream collection. For angles less than 15°, the amount of air contacting the articles is insufficient to impart the desired advancing force thereon.

To accomplish the accelerating function in the high speed system of the present invention, the velocity of the air contacting the article must be greater than the velocity of the article prior to removal from the sheet in order to insure a substantial spacing between successive articles. In other words, the air must accelerate the separated article in order to present it at a downstream handling station for action thereon before the next succeeding separated article arrives at that station. Since acceleration is defined as change in velocity, the value of acceleration in the present case is the difference between the velocity of the separated article under the influence of the air jet and the velocity of the article while still in the sheet during movement up to the stripping roll. In order to provide sufficient acceleration for purposes of the present invention, the velocity of the air should be at least 4,000 and preferably not more than 18,000 feet per minute as measured on leaving the opening in the supply conduit. At velocities below 4,000 feet per minute sufficient acceleration for conventional sized thermoformed items is usually not achievable.

The mass of the article being separated according to the present invention likewise has an all important bearing on the effectiveness of the air jet. The present system has been found to function effectively on relatively lightweight thermoplastic articles having a weight of between 3 to 30 grams. Best results are obtained when the article mass is between 4 to 15 grams.

It is obvious that many variations may be made in the embodiment set forth herein without departing from the spirit and scope of the invention as hereinafter claimed.

What is claimed is:

1. In apparatus for forming an article from a portion of a heated sheet of thermoplastic which includes a mold having a cavity conforming to the shape of the article, means for forcing the heated sheet portion against the cavity surface, a cutting element surrounding said mold for penetrating the sheet around the periphery of the article to partially separate the article from the sheet, a stripping roll adjacent said mold, and means for advancing the sheet with the partially separated article attached therein across a portion of the surface of said stripping roll to release the article from the sheet, the improvement which comprises a conduit located downstream from and adjacent the surface of said stripping roll having a plurality of openings therein oriented for directing pressurized gas against said article as it leaves said stripping roll to assist in separating said article from the sheet and a substantially planar oriented constraining member extending downstream of said conduit to force said separated article to travel away from said stripping roll under the influence of said pressurized gas.

2. The apparatus of claim 1 wherein the holes in the conduit are oriented at an angle of between 15° to 70° with respect to the horizontal.

3. The apparatus of claim 1 wherein the constraining member is oriented in a substantially horizontal direction.

* * * * *